Patented Nov. 18, 1930

1,781,981

UNITED STATES PATENT OFFICE

MYRTIL KAHN, OF COLOGNE-DEUTZ-ON-THE-RHINE, AND ALFRED THAUSS, OF COLOGNE-ON-THE-RHINE, GERMANY, ASSIGNORS TO GENERAL ANILINE WORKS, INC., OF NEW YORK, N. Y., A CORPORATION OF DELAWARE

PROCESS FOR THE MANUFACTURE OF ARYLALKYLETHERS WHICH ARE ARALKYLATED IN THE NUCLEUS AND OF THEIR SULPHONIC ACIDS

No Drawing. Application filed June 21, 1926, Serial No. 117,616, and in Germany June 27, 1925.

The present invention relates to new aromatic compounds substituted in the nucleus by an alkoxy- and an aralkyl-group and furthermore having a sulphonic acid-group which is probably linked to the aryl-residue of the aralkyl-group.

Our new compounds are obtainable by causing aromatic compounds which are substituted by an alkoxy-group to react with an aralkylhalogenide such as benzylchloride or xylylchloride, preferably in the presence of a small quantity of a catalytically acting metal and treating the intermediate products thus obtained with a sulphonating agent.

The reaction takes place advantageously at temperatures above 100° C., while halogen hydracid is vigorously split off, and, according to the molecular weight of the starting materials, the new products form more or less viscous, light oils, which are sparingly soluble in alcohol, but easily soluble in ether, benzene, ligroin, and petroleum-ether. The products are capable of manifold technical applications and they become of particular technical value in the form of their easily soluble sulphonic acids, since the latter are distinguished by an extraordinarily high wetting action on animal and vegetable fibres of all types, even in strongly dilute aqueous solution.

The following example serves to illustrate the wide applicability of our invention:—

43 parts by weight of β-naphtol-iso-amyl ether are slowly heated to 140 to 160° C. with 26 parts by weight of benzylchloride and ½ to 1 part by weight of iron filings and the reaction mixture is kept at this temperature until the brisk evolution of hydrochloric acid gas ceases. After cooling, the mixture is stirred with about 50 parts by weight of 66° Bé. sulfuric acid and then gently heated on the water bath until the product becomes water soluble. At this point, the product is dissolved in water, neutralized and salted out, or alternatively the excess of sulfuric acid is first washed out with common salt solution, and the residue is dissolved, neutralized and evaporated in vacuo. In either case a slightly coloured, amorphous substance of soap-like appearance is obtained which is easily soluble in water giving a colourless solution. The new compound exerts an extraordinarily great wetting action, whether in neutral, alkaline or acid solution. The product has the probable formula as the free acid:

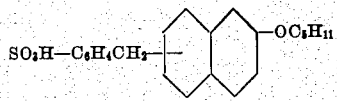

We claim:—

1. As new products aromatic compounds containing an alkoxy- an aralkyl- and a sulphonic acid-group, said sulphonic acid group attached to the aralkyl group, which are easily soluble in water and possess extraordinarily high wetting action on animal and vegetable fibres even in very dilute aqueous solutions.

2. As new products aromatic compounds of the naphthalene series containing an alkoxy- an aralkyl- and a sulphonic acid-group, said sulphonic acid group attached to the aralkyl group, which are easily soluble in water and possess extraordinarily high wetting action on animal and vegetable fibres even in very dilute aqueous solutions.

3. As a new product the herein described compound having probably the formula:

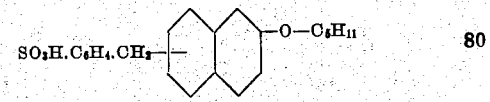

being in the form of its alkali metal salt a light colored amorphous substance of soap-like appearance, easily soluble in water to a substantially colorless solution and having an extraordinarily high wetting action on textile fibres in neutral alkaline and acid solutions.

In testimony whereof we have hereunto set our hands.

MYRTIL KAHN.
ALFRED THAUSS.